US008223267B2

(12) United States Patent
Terajima

(10) Patent No.: US 8,223,267 B2
(45) Date of Patent: Jul. 17, 2012

(54) SIGNAL PROCESSING APPARATUS AND SIGNAL PROCESSING METHOD

(75) Inventor: Makoto Terajima, Kanagawa (JP)

(73) Assignee: Sony Corporation (JP)

( * ) Notice: Subject to any disclaimer, the term of this patent is extended or adjusted under 35 U.S.C. 154(b) by 523 days.

(21) Appl. No.: 12/583,164

(22) Filed: Aug. 14, 2009

(65) Prior Publication Data

US 2010/0045872 A1 Feb. 25, 2010

(30) Foreign Application Priority Data

Aug. 20, 2008 (JP) ................................ P2008-212129

(51) Int. Cl.
*H04N 3/27* (2006.01)

(52) U.S. Cl. ........ 348/554; 348/558; 348/584; 348/705; 348/706; 348/715; 345/211; 345/212; 345/213

(58) Field of Classification Search .................. 348/554, 348/584, 558, 441, 705, 706, 715; 345/211, 345/212, 213
See application file for complete search history.

(56) References Cited

U.S. PATENT DOCUMENTS 5,475,442 A * 12/1995 Matsushita et al. ........... 348/554
5,526,057 A * 6/1996 Flannaghan .................. 348/557
5,598,221 A * 1/1997 Miyahara et al. ............. 348/554
5,790,204 A * 8/1998 Yamaguchi ................... 348/564
5,982,449 A * 11/1999 Nagai et al. .................... 348/553
6,011,594 A * 1/2000 Takashima .................... 348/565
6,137,537 A * 10/2000 Tsuji et al. .................... 348/554
6,351,291 B1 * 2/2002 Asano ........................... 348/564
6,353,460 B1 * 3/2002 Sokawa et al. ................ 348/555
6,519,011 B1 * 2/2003 Shendar ........................ 348/731
6,603,517 B1 * 8/2003 Shen et al. .................... 348/565
6,738,055 B1 5/2004 Abe et al.
7,295,197 B2 11/2007 Abe et al.
7,893,996 B2 * 2/2011 Murakami .................... 348/500
(Continued)

FOREIGN PATENT DOCUMENTS

JP 08146933 A 6/1996
(Continued)

OTHER PUBLICATIONS

Office Action from Japanese Application No. 2008-212129, dated Jul. 27, 2010.

*Primary Examiner* — Jefferey Harold
*Assistant Examiner* — Mustafizur Rahman
(74) *Attorney, Agent, or Firm* — Lerner, David, Littenberg, Krumholz & Mentlik, LLP

(57) ABSTRACT

There is provided a signal processing apparatus including a first image generating unit, a second image generating unit, a first selecting unit selects at least one of the first image generating unit and the second image generating unit and outputs an image, an image signal processing unit that performs signal processing on the image and outputs the processed image, a second selecting unit that selects one of the first selecting unit and the image signal processing unit and outputs an image, a storing unit that stores information on operations of the second image generating unit and the image signal processing unit, and a third selecting unit that selects at least one of the second image generating unit and the image signal processing unit and connects the selected one to the storing unit, whereby the storing unit is shared between the second image generating unit and the image signal processing unit.

7 Claims, 7 Drawing Sheets

U.S. PATENT DOCUMENTS

2003/0030755 A1* 2/2003 Ahn .............................. 348/732

FOREIGN PATENT DOCUMENTS

JP 2000-276091 A 10/2000
JP 2001-042831 A 2/2001
JP 2001204009 A 7/2001
JP 2002-125200 A 4/2002
JP 2002-359819 A 12/2002
JP 2003140638 A 5/2003
JP 2005017725 A 1/2005
JP 2005236551 A 9/2005

* cited by examiner

SIGNAL PROCESSING APPARATUS AND SIGNAL PROCESSING METHOD

CROSS-REFERENCE TO RELATED APPLICATION

The present application claims priority from Japanese Patent Application No. JP 2008-212129 filed in the Japanese Patent Office on Aug. 20, 2008, the entire content of which is incorporated herein by reference.

BACKGROUND OF THE INVENTION

1. Field of the Invention

The present invention relates to a signal processing apparatus and a signal processing method.

2. Description of the Related Art

In a moving image display apparatus in related art that displays a moving image such as a movie at high quality and at a high refresh rate and displays high-definition computer graphics, generally, memory bandwidth is used mainly by a frame rate conversion mechanism that converts a frame rate and a graphics computation mechanism that performs graphics processing.

In the moving image display apparatus in related art, since semiconductor memory apparatuses are used separately by the frame rate conversion mechanism and the graphics computation mechanism, there is an issue that the number of semiconductor memory apparatuses increases, increasing circuit size. To solve such an issue, moving image display apparatuses that aim to reduce the number of memories are disclosed in, for example, Japanese Patent Application Laid-Open Nos. 2002-125200 and 2002-359819.

SUMMARY OF THE INVENTION

The techniques disclosed in Japanese Patent Application Laid-Open Nos. 2002-125200 and 2002-359819, however, do not mention a reduction in the number of memories by switching images to be inputted or display refresh rates and thus there is an issue that the number of memories may not also be reduced when a moving image is displayed by switching display refresh rates.

The present invention addresses the above-identified and other issues associated with methods and apparatuses in related art. There is a need for a novel and improved signal processing apparatus and signal processing method that enable reduction of the number of memories by sharing memories around the time of switching images to be inputted or display refresh rates.

According to an embodiment of the present invention, there is provided a signal processing apparatus including: a first image generating unit that generates an image; a second image generating unit that generates an image different from the image generated by the first image generating unit; a first selecting unit that selects at least one of the first image generating unit and the second image generating unit and outputs an image from the selected one; an image signal processing unit that performs signal processing on the image outputted from the first selecting unit and outputs the processed image; a second selecting unit that selects one of the first selecting unit and the image signal processing unit and outputs an image from the selected one; a storing unit that stores information on operations of the second image generating unit and the image signal processing unit; and a third selecting unit that selects at least one of the second image generating unit and the image signal processing unit and connects the selected one to the storing unit, whereby the storing unit is shared between the second image generating unit and the image signal processing unit.

According to such a configuration, the first image generating unit generates an image, the second image generating unit generates an image different from the image generated by the first image generating unit, and the first selecting unit selects at least one of the first image generating unit and the second image generating unit and outputs an image from the selected one. The image signal processing unit performs signal processing on the image outputted from the first selecting unit and outputs the processed image. The second selecting unit selects one of the first selecting unit and the image signal processing unit and outputs an image from the selected one. The storing unit stores information on operations of the second image generating unit and the image signal processing unit. The third selecting unit selects at least one of the second image generating unit and the image signal processing unit and connects the selected one to the storing unit, whereby the storing unit is shared between the second image generating unit and the image signal processing unit. As a result, by switching input images, the number of memories can be reduced.

The signal processing apparatus according to an embodiment of the present invention may further include a selection control unit that controls selections made by the second selecting unit and the third selecting unit.

When the first selecting unit selects the first image generating unit, the second selecting unit and the third selecting unit may select the image signal processing unit.

When the first selecting unit selects the second image generating unit, the second selecting unit may select the first selecting unit and the third selecting unit may select the second image generating unit.

When the first selecting unit selects the first image generating unit and the second image generating unit, the second selecting unit may select the image signal processing unit and the third selecting unit may select the second image generating unit and the image signal processing unit.

The image signal processing unit may perform a process of converting a frame rate.

According to another embodiment of the present invention, there is provided a signal processing method including: a first image generation step of generating an image in a first image generating unit; a second image generation step of generating an image in a second image generating unit that is different from the image generated in the first image generation step; a first selection step of selecting at least one of the image generated in the first image generation step and the image generated in the second image generation step and outputting the selected image; an image signal processing step of performing, in an image signal processing unit, signal processing on the image outputted in the first selection step and outputting the processed image; a second selection step of selecting one of the image outputted in the first selection step and the image outputted in the image signal processing step and outputting the selected image; and a third selection step of selecting at least one of the second image generating unit and the image signal processing unit and connecting the selected one to a storing unit that stores information on operations of the second image generating unit and the image signal processing unit, whereby the storing unit is shared between the second image generating unit and the image signal processing unit.

As described above, according to the present invention, a novel and improved signal processing apparatus and signal processing method can be provided that enable reduction of the number of memories by switching input images.

DETAILED DESCRIPTION OF THE PREFERRED EMBODIMENTS

Figure 1:
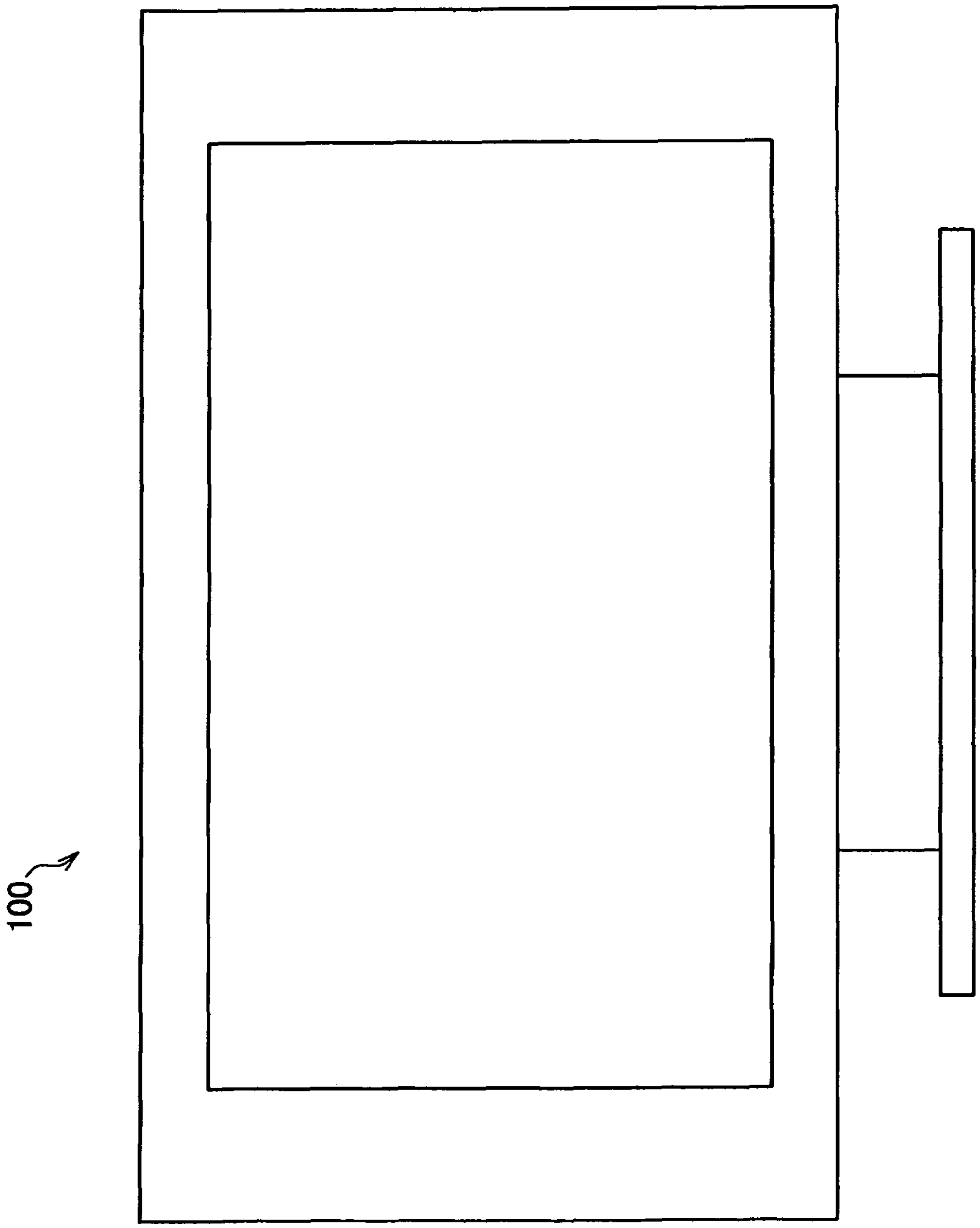
FIG. 1 is an illustrative view showing the external appearance of a moving image display apparatus 100 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A preferred embodiment of the present invention will be described in detail in the following order.

(1) Configuration of a moving image display apparatus in related art (2) Configuration of a moving image display apparatus according to an embodiment of the present invention (3) Operation of the moving image display apparatus according to the embodiment of the present invention (4) Conclusions

(1) CONFIGURATION OF A MOVING IMAGE DISPLAY APPARATUS IN RELATED ART

Figure 7:
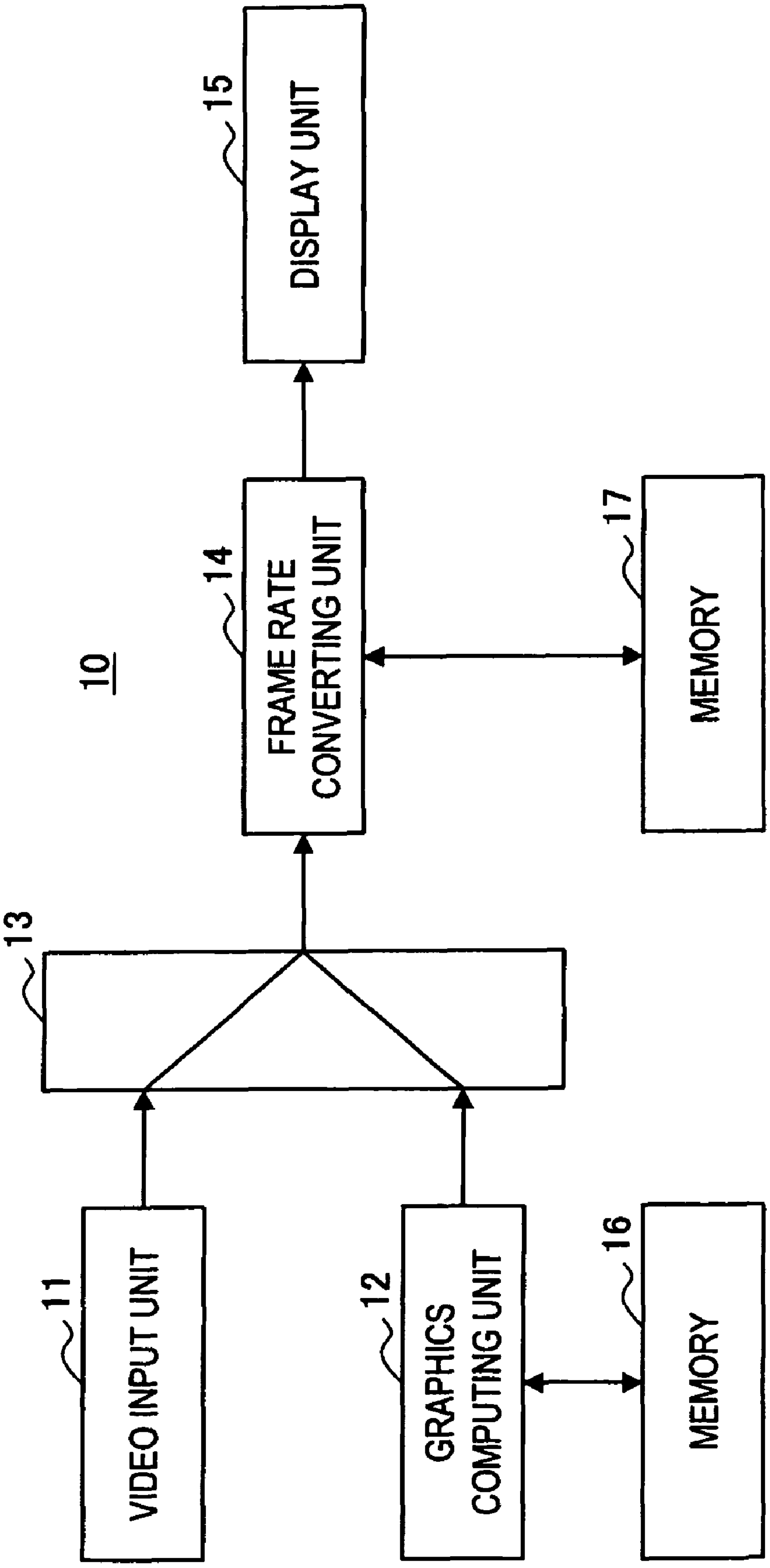
FIG. 7 is an illustrative view showing a configuration of a moving image display apparatus 10 in related art.

First, prior to describing in detail a preferred embodiment of the present invention, a configuration of a moving image display apparatus in related art will be described. FIG. 7 is an illustrative view showing a configuration of a moving image display apparatus 10 in related art. The configuration of the moving image display apparatus 10 in related art will be described below with reference to FIG. 7.

As shown in FIG. 7, the moving image display apparatus 10 in related art includes a video input unit 11, a graphics computing unit 12, a video input switching unit 13, a frame rate converting unit 14, a display unit 15, a first memory 16, and a second memory 17.

The video input unit 11 generates moving images from moving image sources such as television broadcasts, hard disk recorders, optical disk recorders, and other video media. The video input unit 11 generates, for example, a 60 Hz moving image. The graphics computing unit 12 generates computer graphics moving images and generates, for example, high-definition moving images such as three-dimensional computer graphics. The graphics computing unit 12 is connected to the first memory 16.

The video input switching unit 13 selects one of moving images respectively supplied from the video input unit 11 and the graphics computing unit 12, according to a moving image to be displayed on the display unit 15. The moving image selected by the video input switching unit 13 passes through the frame rate converting unit 14 and is then displayed on the subsequent display unit 15.

Note that the video input switching unit 13 may output a composite moving image formed from a moving image supplied from the video input unit 11 and a moving image supplied from the graphics computing unit 12. In the configuration shown in FIG. 7, the video input switching unit 13 can generally generate a composite moving image as changing a composite ratio according to a coefficient value supplied from the graphics computing unit 12.

The frame rate converting unit 14 converts the frame rate of the moving image outputted from the video input switching unit 13 and outputs the resulting moving image. The frame rate converting unit 14 is connected to the second memory 17. The frame rate converting unit 14, for example, accepts as input a moving image with 60 Hz which is a refresh rate for general broadcasts, etc., and generates and outputs a moving image with 120 Hz which is a high-quality refresh rate. The display unit 15 displays the moving image whose frame rate is converted by the frame rate converting unit 14.

The first memory 16 is a semiconductor memory connected to the graphics computing unit 12. The first memory 16 requires, for example, a bandwidth of 51.2 Gbps (Giga bits per second) and a capacity of 128 MB (Mega Bytes) when the graphics computing unit 12 operates.

The second memory 17 is a semiconductor memory connected to the frame rate converting unit 14. The second memory 17 requires, for example, a bandwidth of 22.5 Gbps and a capacity of 64 MB when the frame rate converting unit 14 operates.

When the first memory 16 and the second memory 17 are implemented using a plurality of semiconductor memory apparatuses, each, for example, providing a bandwidth of 12.8 Gbps and a capacity of 32 MB, operating at a data rate of 800 MHz, and having a 16-bit width, the first memory 16 and the second memory 17 can be implemented using six semiconductor memory apparatuses in total, i.e., four for the first memory 16 and two for the second memory 17.

The configuration of the moving image display apparatus 10 in related art has been described above. As such, in the moving image display apparatus 10 in related art, semiconductor memories are respectively connected to the graphics computing unit 12 and the frame rate converting unit 14. However, since the semiconductor memories are respectively connected to the graphics computing unit 12 and the frame rate converting unit 14, for example, even when the graphics computing unit 12 is not in operation, the first memory 16 connected to the graphics computing unit 12 may not be used by the frame rate converting unit 14, and even when the frame rate converting unit 14 is not in operation, the second memory 17 connected to the frame rate converting unit 14 may not be used by the graphics computing unit 12. Hence, a memory may not be shared between the graphics computing unit 12 and the frame rate converting unit 14, causing an issue of an increase in circuit size and cost.

In view of this, the present invention provides a signal processing apparatus and a signal processing method that enable reduction of a circuit size and cost by allowing a semiconductor memory to be shared between a graphics computation process and a frame rate conversion process. In the following, a preferred embodiment of the present invention will be described in detail.

(2) CONFIGURATION OF A MOVING IMAGE DISPLAY APPARATUS ACCORDING TO AN EMBODIMENT OF THE PRESENT INVENTION

Figure 2:
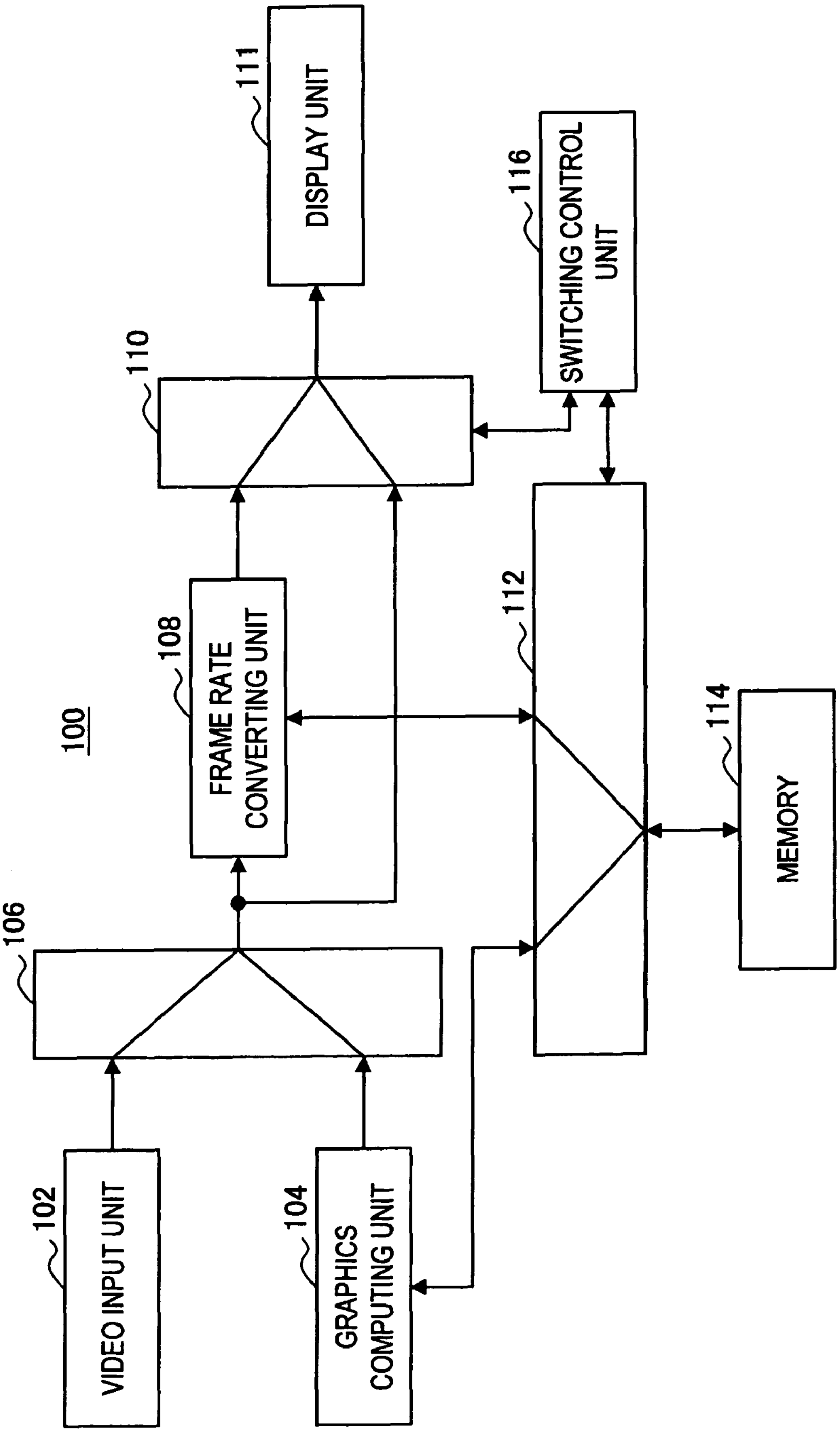
FIG. 2 is an illustrative view showing a configuration of the moving image display apparatus 100 according to the embodiment of the present invention.

First, a moving image display apparatus according to an embodiment of the present invention will be described. FIG. 1 is an illustrative view showing the external appearance of a moving image display apparatus 100 according to an embodiment of the present invention. FIG. 2 is an illustrative view showing a configuration of the moving image display apparatus 100 according to the embodiment of the present invention. The configuration of the moving image display apparatus 100 according to the embodiment of the present invention will be described below with reference to FIGS. 1 and 2.

The moving image display apparatus 100 according to the embodiment of the present invention shown in FIGS. 1 and 2 is an example of a signal processing apparatus according to an embodiment of the present invention. As shown in FIG. 1, the moving image display apparatus 100 according to the embodiment of the present invention is provided with a display unit 111 for displaying a moving image.

As shown in FIG. 2, the moving image display apparatus 100 according to the embodiment of the present invention includes a video input unit 102, a graphics computing unit 104, a video input switching unit 106, a frame rate converting unit 108, a display mode switching unit 110, a display unit 111, a memory sharing unit 112, a memory 114, and a switching control unit 116.

The video input unit 102 is an example of a first image generating unit according to an embodiment of the present invention. The video input unit 102 generates moving image signals to be displayed on the display unit 111 as moving images, from moving image sources such as television broadcasts, hard disk recorders, optical disk recorders, and other video media. The video input unit 102 generates a moving image signal with a frequency (fv) of, for example, 60 Hz. The moving image signal generated by the video input unit 102 is sent to the video input switching unit 106.

The graphics computing unit 104 is an example of a second image generating unit according to an embodiment of the present invention. The graphics computing unit 104 generates moving image signals to be displayed on the display unit 111 as computer graphics moving images and generates, for example, an image displayed by an Internet WWW (World Wide Web) browser and a high-definition moving image such as three-dimensional computer graphics. In the present embodiment, the graphics computing unit 104 generates and outputs an image with higher definition than that of an image generated by the video input unit 102. The graphics computing unit 104 generates a computer graphics moving image with a frequency (fv) of, for example, 60 Hz. The graphics computing unit 104 is connected to the memory 114 through the memory sharing unit 112.

The video input switching unit 106 is an example of a first selecting unit according to an embodiment of the present invention. The video input switching unit 106 selects a moving image signal(s) supplied from the video input unit 102 and/or the graphics computing unit 104, according to a moving image to be displayed on the display unit 111. The moving image signal(s) selected by the video input switching unit 106 passes through the frame rate converting unit 108 and the display mode switching unit 110 and is then outputted to the subsequent display unit 111 where the moving image signal(s) is displayed as a moving image(s).

Note that the video input switching unit 106 may combine a moving image signal supplied from the video input unit 102 and a moving image signal supplied from the graphics computing unit 104 and output the resulting composite moving image signal. In the configuration shown in FIG. 2, the video input switching unit 106 may combine moving image signals as changing a combination ratio according to a coefficient value supplied from the graphics computing unit 104. When a moving image signal supplied from the video input unit 102 and a moving image signal supplied from the graphics computing unit 104 are combined, the moving image signals are displayed on the display unit 111 as a moving image in which the moving image signals are combined.

The frame rate converting unit 108 is an example of an image signal processing unit according to an embodiment of the present invention. The frame rate converting unit 108 performs a frame rate conversion process for converting a frame rate, on the moving image signal outputted from the video input switching unit 106 and outputs the moving image signal whose frame rate has been converted. The frame rate converting unit 108 is connected to the memory 114 through the memory sharing unit 112. The frame rate converting unit 108, for example, accepts as input a moving image signal with 60 Hz which is a refresh rate for general broadcasts, etc., and generates and outputs a moving image signal with 120 Hz which is a high-quality refresh rate. The moving image signal outputted from the frame rate converting unit 108 passes through the display mode switching unit 110 and is supplied to the subsequent display unit 111 where the moving image signal is displayed as a moving image. Note that although in the present embodiment a frame rate conversion process is performed on a moving image signal, needless to say, the present invention is not limited thereto and image signal processing other than a frame rate conversion process may be performed on a moving image signal.

The display mode switching unit 110 is an example of a second selecting unit according to an embodiment of the present invention. The display mode switching unit 110 switches between display modes of a moving image to be displayed on the display unit 111. The display mode switching unit 110 selects one of a moving image based on the moving image signal whose frame rate is converted by the frame rate converting unit 108 and a moving image based on the moving image signal whose frame rate is not converted and which is outputted from the video input switching unit 106 and can thereby display the selected moving image on the display unit 111.

The moving image display apparatus 100 according to the present embodiment has two display modes, i.e., a high-speed display mode which is a display mode for when a moving image such as a movie is displayed at high quality and at a high refresh rate and a low-speed display mode which is a display mode for when video is displayed at a low refresh rate other than when the high-speed display mode is used, such as when high-definition computer graphics is displayed. The display mode can be switched and used by a user of the moving image display apparatus 100 according to a desired mode.

In the present embodiment, the timing at which the display mode is switched may be, for example, one at which the user performs an operation on a remote controller or one at which a video signal is inputted to the video input unit 102. Examples of the operation on the remote controller by the user include switching of a video input to an external input and explicit display mode switching.

The display unit 111 is to display a moving image and displays a moving image based on the moving image signal outputted from the display mode switching unit 110. For the display unit 111, a liquid crystal display apparatus, a plasma display apparatus, an organic EL display apparatus, and other video display devices can be used. Though not shown in FIG. 2, the display unit 111 includes a signal processing circuit for analyzing a moving image signal supplied from the display mode switching unit 110 and displaying a moving image based on a result of the analysis.

The memory sharing unit 112 is an example of a third selecting unit according to an embodiment of the present invention. The memory sharing unit 112 couples connections of the graphics computing unit 104 and the frame rate converting unit 108 to a storage apparatus (memory 114) in the respective display modes and thereby allows a bandwidth and a capacity of the storage apparatus (memory 114) to be shared between the graphics computing unit 104 and the frame rate converting unit 108. The memory sharing unit 112 may be implemented by, for example, a memory bus implemented by a semiconductor circuit.

The memory 114 is a semiconductor memory connected to the graphics computing unit 104 and the frame rate converting unit 108 through the memory sharing unit 112. A bandwidth required for the memory 114 is the maximum value of the sum of a bandwidth requested to the memory sharing unit 112 by the graphics computing unit 104 and a bandwidth requested to the memory sharing unit 112 by the frame rate converting unit 108 in the respective display modes. Similarly, a capacity required for the memory 114 is the maximum value of the sum of a capacity requested to the memory sharing unit 112 by the graphics computing unit 104 and a capacity requested to the memory sharing unit 112 by the frame rate converting unit 108 in the respective display modes.

For example, in the high-speed display mode of the moving image display apparatus 100 according to the present embodiment, though described later, the operation of the graphics computing unit 104 is stopped. Hence, the bandwidth and capacity of the graphics computing unit 104 are not requested to the memory sharing unit 112. Meanwhile, in the high-speed display mode, since the frame rate converting unit 108 is in operation in order to convert the refresh rate of a moving image, a bandwidth of 22.5 Gbps and a capacity of 64 MB, for example, are requested to the memory sharing unit 112. Accordingly, in the high-speed display mode, the memory 114 requires, for example, a bandwidth of 22.5 Gbps and a capacity of 64 MB.

In the low-speed display mode of the moving image display apparatus 100 according to the present embodiment, the graphics computing unit 104 is in operation and thus a bandwidth of 51.2 Gbps and a capacity of 128 MB, for example, are requested to the memory sharing unit 112. Meanwhile, in the low-speed display mode, since there is no need to convert a frame rate, the operation of the frame rate converting unit 108 is stopped and thus does not request the memory sharing unit 112 for its bandwidth and capacity. Accordingly, in the low-speed display mode, the memory 114 requires, for example, a bandwidth of 51.2 Gbps and a capacity of 128 MB.

Hence, in such a case, the bandwidth and capacity required for the memory 114 are a bandwidth of 51.2 Gbps and a capacity of 128 MB which are maximum values and required for the graphics computing unit 104. When the memory 114 is implemented using a plurality of semiconductor memory apparatuses, each, for example, providing a bandwidth of 12.8 Gbps and a capacity of 32 MB, operating at a data rate of 800 MHz, and having a 16-bit width, the memory 114 can be implemented using four of such semiconductor memory apparatuses. Thus, comparing with the above-described moving image display apparatus 10 in related art, the number of semiconductor memory apparatuses of the same type can be reduced by two.

The switching control unit 116 controls switching operations of the display mode switching unit 110 and the memory sharing unit 112. For example, when the user of the moving image display apparatus 100 makes a setting to display a moving image on the display unit 111 in the high-speed display mode, the switching control unit 116 controls the display mode switching unit 110 to be connected to the frame rate converting unit 108 and controls the memory sharing unit 112 to connect the frame rate converting unit 108 to the memory 114. When the user of the moving image display apparatus 100 makes a setting to display a moving image on the display unit 111 in the low-speed display mode, the switching control unit 116 controls the display mode switching unit 110 to be connected to the video input switching unit 106 and controls the memory sharing unit 112 to connect the graphics computing unit 104 to the memory 114.

The configuration of the moving image display apparatus 100 according to the embodiment of the present invention has been described above. Next, the operation of the moving image display apparatus 100 according to the embodiment of the present invention will be described.

(3) OPERATION OF THE MOVING IMAGE DISPLAY APPARATUS ACCORDING TO THE EMBODIMENT OF THE PRESENT INVENTION

The operation of the moving image display apparatus 100 according to the embodiment of the present invention will be described for each display mode. First, the operation of the moving image display apparatus 100 for when a moving image is displayed in the high-speed display mode will be described.

Figure 3:
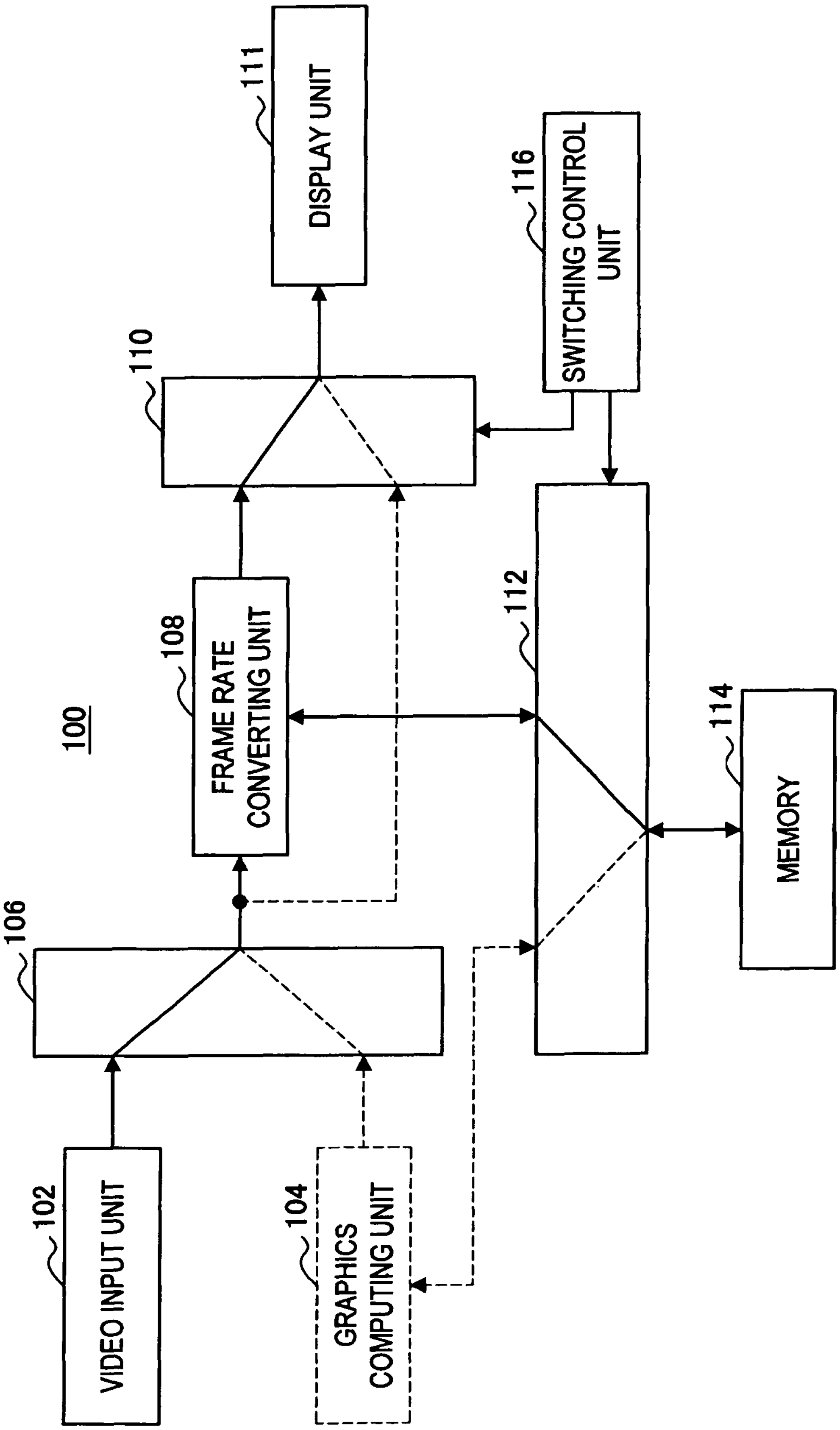
FIG. 3 is an illustrative view showing the operation of the moving image display apparatus 100 for when a moving image is displayed in a high-speed display mode.

FIG. 3 is an illustrative view showing the operation of the moving image display apparatus 100 for when a moving image is displayed in the high-speed display mode. In the moving image display apparatus 100 according to the embodiment of the present invention, in the high-speed display mode, the operation of the graphics computing unit 104 is stopped and the frame rate converting unit 108 is in operation. Thus, in FIG. 3, for convenience sake, the graphics computing unit 104 whose operation is stopped, lines connected to the graphics computing unit 104, and a line connected directly to the display mode switching unit 110 from the video input switching unit 106 are indicated by dashed lines to show that the operation is stopped.

To allow the moving image display apparatus 100 according to the embodiment of the present invention to operate in the high-speed display mode, for example, a CPU or any other control unit (not shown) sends out an activation instruction to the video input unit 102 and sends out a pause instruction to the graphics computing unit 104. Also, the video input switching unit 106 is instructed to select an output from the video input unit 102 and an activation instruction is sent out to the frame rate converting unit 108. The display mode switching unit 110 is instructed to select an output from the frame rate converting unit 108 and the display unit 111 is instructed for high-speed display to display a moving image whose refresh rate is 120 Hz. Note that the order in which the instructions are sent out to the respective units may be any order.

In the high-speed display mode, when a moving image signal having a 60 Hz refresh rate is inputted from the video input unit 102, the moving image signal passes through the video input switching unit 106 and is sent to the frame rate converting unit 108. The frame rate converting unit 108 performs a process of converting the refresh rate from 60 Hz to 120 Hz. As regards the refresh rate conversion process performed by the frame rate converting unit 108, which is not directly related to the present invention, a detailed description is omitted.

When the refresh rate of the moving image signal is converted from 60 Hz to 120 Hz by the frame rate converting unit 108, the frame rate converting unit 108 outputs the converted moving image signal to the display unit 111 through the display mode switching unit 110. The display unit 111 displays a moving image with a 120 Hz refresh rate which is outputted from the frame rate converting unit 108.

As described above, in the high-speed display mode, the operation of the graphics computing unit 104 is stopped. Thus, in the high-speed display mode, the bandwidth and capacity of the graphics computing unit 104 are not requested to the memory sharing unit 112. In contrast, in the high-speed display mode, since the frame rate converting unit 108 is in operation in order to convert the refresh rate of a moving image signal, a bandwidth of 22.5 Gbps and a capacity of 64 MB, for example, are requested to the memory sharing unit 112. Accordingly, in the high-speed display mode, the memory 114 requires, for example, a bandwidth of 22.5 Gbps and a capacity of 64 MB.

Figure 4:
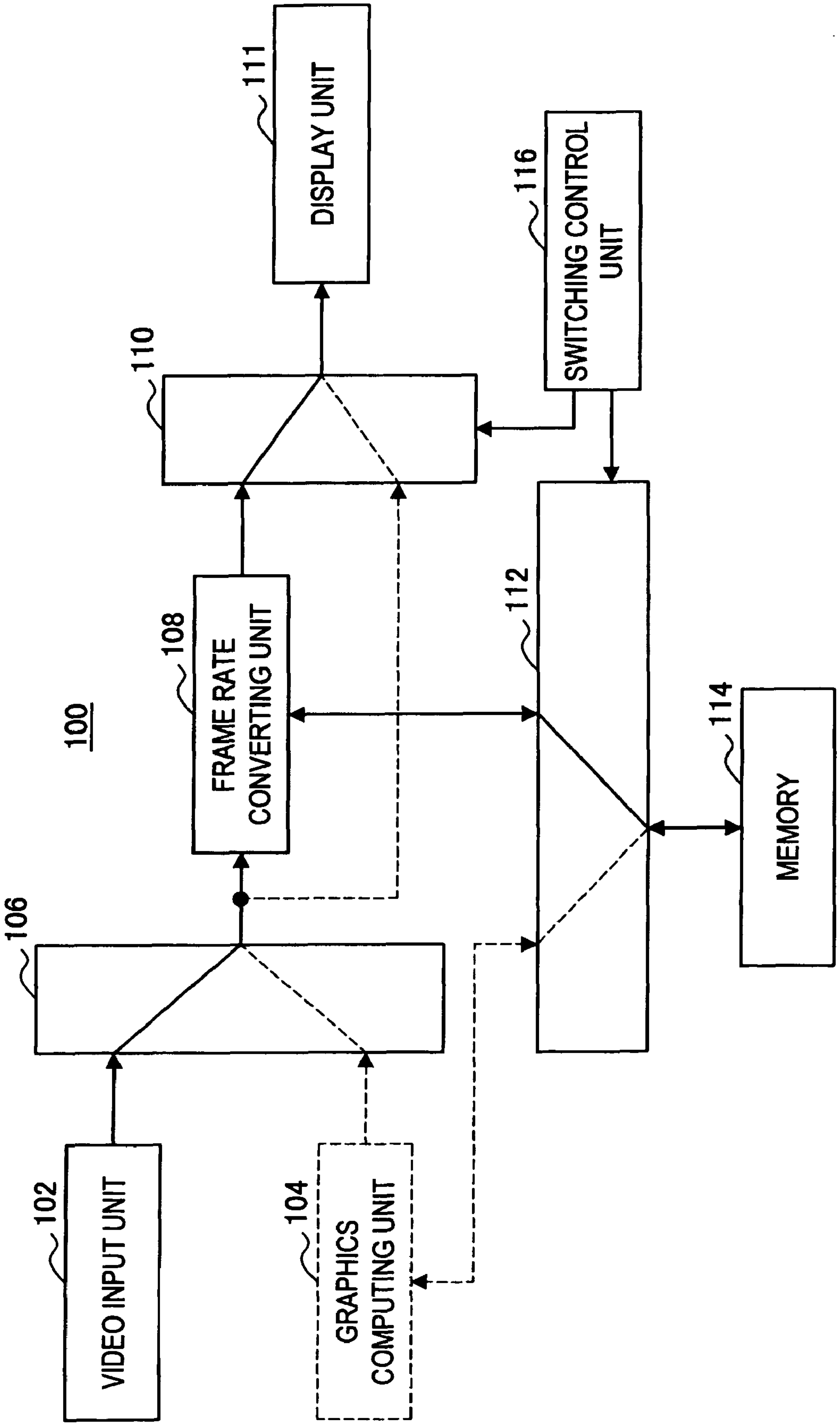
FIG. 4 is an illustrative view showing the operation of the moving image display apparatus 100 for when a moving image is displayed in a low-speed display mode.

Next, the operation of the moving image display apparatus 100 for when a moving image is displayed in the low-speed display mode will be described. FIG. 4 is an illustrative view showing the operation of the moving image display apparatus 100 for when a moving image is displayed on the display unit 111 in the low-speed display mode.

In the moving image display apparatus 100 according to the embodiment of the present invention, in the high-speed display mode, the graphics computing unit 104 is in operation and the operation of the frame rate converting unit 108 is stopped. Thus, in FIG. 4, for convenience sake, the frame rate converting unit 108 whose operation is stopped, lines connected to the frame rate converting unit 108, and a line connected directly to the display mode switching unit 110 from the video input switching unit 106 are indicated by dashed lines to show that the operation is stopped.

To allow the moving image display apparatus 100 according to the embodiment of the present invention to operate in the low-speed display mode, for example, a CPU or any other control unit (not shown) sends out a pause instruction to the video input unit 102 and sends out an activation instruction to the graphics computing unit 104. Also, the video input switching unit 106 is instructed to select an output from the graphics computing unit 104 and a pause instruction is sent out to the frame rate converting unit 108. The display mode switching unit 110 is instructed to select an output from the video input switching unit 106 and the display unit 111 is instructed for low-speed display to display a moving image whose refresh rate is 60 Hz. Note that the order in which the instructions are sent out to the respective units may be any order.

According to FIG. 4, a moving image signal is supplied from the graphics computing unit 104. On the other hand, in the low-speed display mode, a moving image signal may be supplied from the video input unit 102. FIG. 4 shows the case of using the memory 114 to supply a moving image signal from the graphics computing unit 104.

In the example shown in FIG. 4, in the low-speed display mode, when a moving image signal having a 60 Hz refresh rate is inputted from the graphics computing unit 104, the moving image signal passes through the video input switching unit 106 and the display mode switching unit 110 without passing through the frame rate converting unit 108 and is then outputted to the display unit 111. The display unit 111 displays a moving image with a 60 Hz refresh rate which is supplied from the graphics computing unit 104.

As described above, in the low-speed display mode of the moving image display apparatus 100 according to the present embodiment, the graphics computing unit 104 is in operation and thus a bandwidth of 51.2 Gbps and a capacity of 128 MB, for example, are requested to the memory sharing unit 112. Meanwhile, in the low-speed display mode, since there is no need to convert a frame rate, the operation of the frame rate converting unit 108 is stopped and thus does not request the memory sharing unit 112 for its bandwidth and capacity. Accordingly, in the low-speed display mode, the memory 114 requires, for example, a bandwidth of 51.2 Gbps and a capacity of 128 MB.

As such, the portions operating in the moving image display apparatus 100 vary depending on the display mode of a moving image to be displayed on the display unit 111. Hence, by using semiconductor memories in a shared manner between the operating portions that vary depending on the display mode, the number of semiconductor memories to be used can be reduced, contributing to a reduction in circuit area and cost.

Note that although in the above description two types of display modes for a moving image to be displayed on the display unit 111 are exemplified, i.e., the high-sped display mode and the low-speed display mode, other display modes may be present. For example, as a display mode for a moving image to be displayed on the display unit 111, a composite display mode in which the high-speed display mode and the low-speed display mode are combined may be present.

Figure 5:
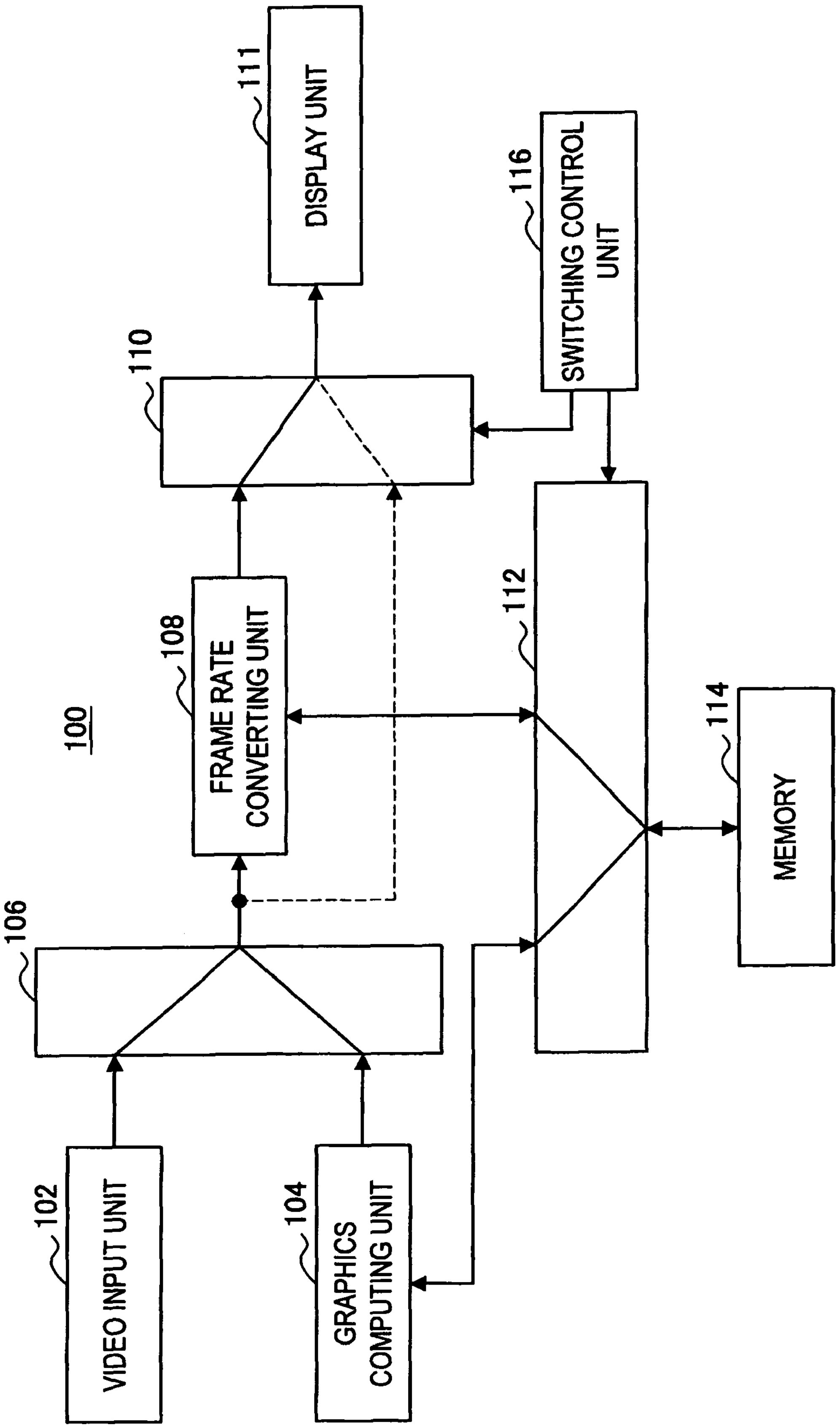
FIG. 5 is an illustrative view showing the operation of the moving image display apparatus 100 for when a moving image is displayed in a composite display mode.

FIG. 5 is an illustrative view showing the operation of the moving image display apparatus 100 for when a moving image is displayed on the display unit 111 in a composite display mode in which the high-speed display mode and the low-speed display mode are combined. In the composite display mode according to the present embodiment, the graphics computing unit 104 generates a moving image signal by three-dimensional computer graphics with lower definition than that in the low-speed display mode, and at the same time, the frame rate converting unit 108, for example, accepts as input a moving image signal with 60 Hz which is a normal refresh rate and generates an intermediate-quality moving image signal with a 120 Hz refresh rate. Then, in the composite display mode according to the present embodiment, the display mode switching unit 110 outputs a composite moving image signal formed from the moving image signal supplied from the video input unit 102 and the moving image signal supplied from the graphics computing unit 104.

To allow the moving image display apparatus 100 according to the embodiment of the present invention to operate in the composite display mode, for example, a CPU or any other control unit (not shown) sends out an activation instruction to the video input unit 102 and also sends out an activation instruction to the graphics computing unit 104. The video input switching unit 106 is instructed to combine an output from the video input unit 102 and an output from the graphics computing unit 104 at any combination ratio and output the combined signal. An activation instruction is sent out to the frame rate converting unit 108. The display mode switching unit 110 is instructed to select an output from the frame rate converting unit 108 and the display unit 111 is instructed for high-speed display to display a moving image whose refresh rate is 120 Hz. Note that the order in which the instructions are sent out to the respective units may be any order.

Accordingly, FIG. 5 shows a state in which the memory 114 is shared between the graphics computing unit 104 and the frame rate converting unit 108. In the composite display mode, the graphics computing unit 104 requests the memory sharing unit 112 for, for example, a bandwidth of 24.9 Gbps and a capacity of 64 MB. Also, in the composite display mode, the frame rate converting unit 108 requests the memory sharing unit 112 for, for example, a bandwidth of 13.5 Gbps and a capacity of 32 MB. Thus, in the composite display mode, the memory 114 requires a bandwidth of 38.4 Gbps and a capacity of 96 MB. Note that when the memory 114 is shared between the graphics computing unit 104 and the frame rate converting unit 108, the memory sharing unit 112 may control a connection destination such that access to the memory 114 is performed in a time division manner.

When the moving image display apparatus 100 has two modes, i.e., the low-speed display mode and the composite display mode, with an operation in the low-speed display mode requiring a bandwidth of 51.2 Gbps and a capacity of 128 MB in the memory 114, the bandwidth and capacity required for the memory 114 are a bandwidth of 51.2 Gbps and a capacity of 128 MB which are maximum values of the two display modes. When the memory 114 is implemented using a plurality of semiconductor memory apparatuses, each, for example, providing a bandwidth of 12.8 Gbps and a capacity of 32 MB, operating at a data rate of 800 MHz, and having a 16-bit width, the memory 114 can be implemented using four of such semiconductor memory apparatuses.

Figure 6:
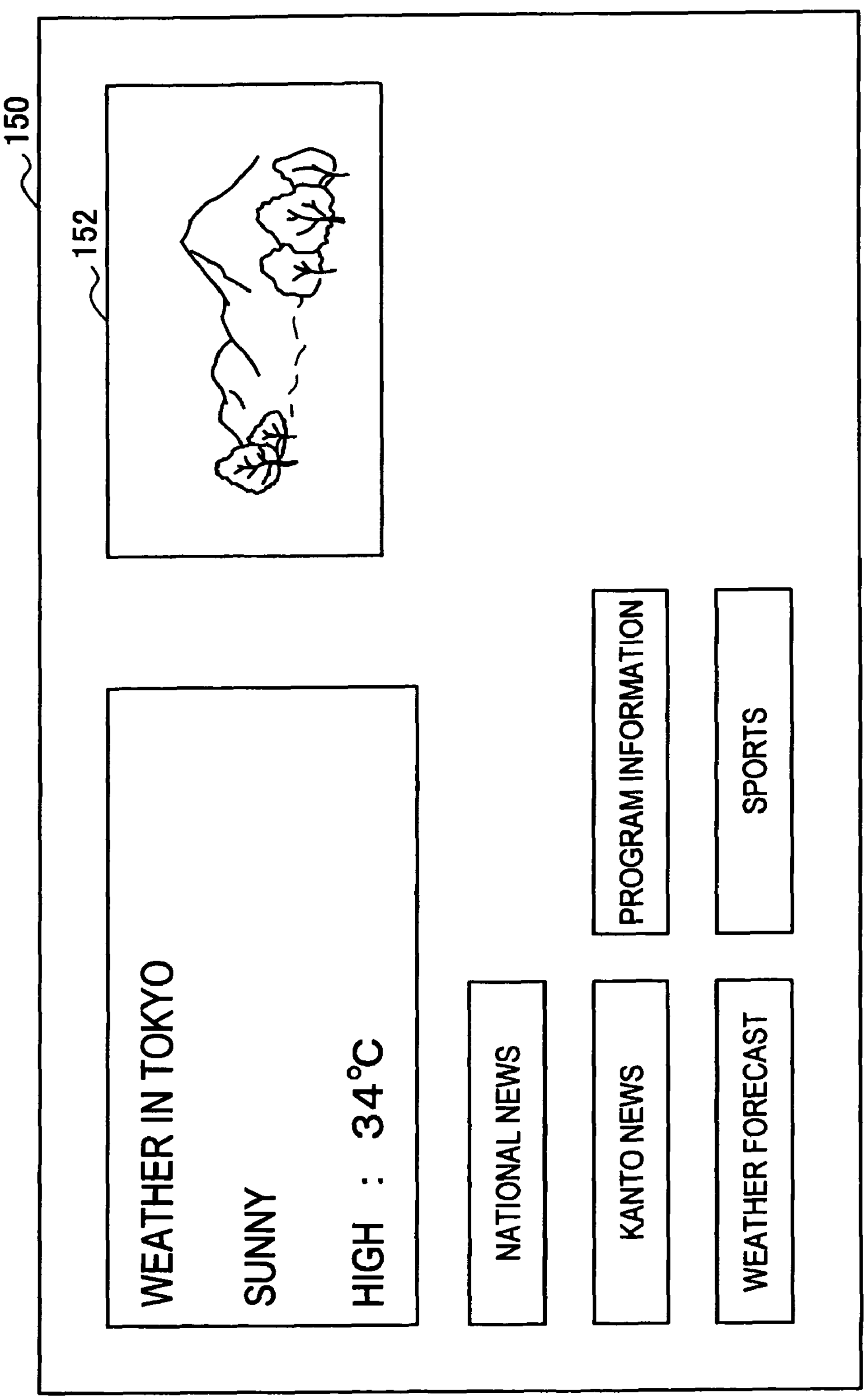
FIG. 6 is an illustrative view showing an example of moving images displayed on the display unit 111 in the composite display mode in the moving image display apparatus 100 according to the embodiment of the present invention.

FIG. 6 is an illustrative view showing an example of moving images displayed on the display unit 111 in the composite display mode in the moving image display apparatus 100 according to the embodiment of the present invention. FIG. 6 shows a data broadcasting screen 150 in terrestrial digital broadcasting or BS digital broadcasting, as an example of moving images displayed on the display unit 111 in the composite display mode in the moving image display apparatus 100 according to the embodiment of the present invention. On the data broadcasting screen shown in FIG. 6, a moving image from the video input unit 102 is displayed on an upper right portion of the screen denoted by reference numeral 152 and moving images generated by the graphics computing unit 104 are displayed in other areas.

Even when moving images are thus displayed by a combination of the high-speed display mode and the low-speed display mode, by using semiconductor memories in a shared manner between the graphics computing unit 104 and the frame rate converting unit 108, the number of semiconductor memories to be used can be reduced, contributing to a reduction in circuit area and cost.

The operation of the moving image display apparatus 100 according to the embodiment of the present invention has been described above for each display mode. In addition, the above-described operations of the moving image display apparatus 100 may be performed in a manner such that a control means such as a CPU provided in the moving image display apparatus 100 sequentially reads a computer program stored in a storing means in the moving image display apparatus 100 and executes the computer program.

(4) CONCLUSIONS

As described above, according to the embodiment of the present invention, the moving image display apparatus 100 includes the memory sharing unit 112 and the display mode switching unit 110. By the memory sharing unit 112 and the display mode switching unit 110, when a moving image such as a movie is displayed at high quality and at a high refresh rate the high-speed display mode is used, and when a mode other than the high-speed display mode is used, such as when high-definition computer graphics is displayed, the low-speed display mode in which video is displayed at a low refresh rate is used. By using these two modes by switching them, high-quality display of a moving image such as a movie at a high refresh rate and display of high-definition computer graphics can be implemented with a smaller circuit area and at lower hardware cost, without impairing user's substantial convenience, as compared with moving image display apparatuses in related art.

By controlling a selection of a connection destination made by the memory sharing unit 112 such that the memory 114 is shared between the graphics computing unit 104 and the frame rate converting unit 108, display mode switching can be implemented at lower hardware cost as compared with moving image display apparatuses in related art.

It should be understood by those skilled in the art that various modifications, combinations, sub-combinations and alterations may occur depending on design requirements and other factors insofar as they are within the scope of the appended claims or the equivalents thereof.

Although the above embodiment describes, as an example, the moving image display apparatus 100 that generates and displays moving image signals, needless to say, the present invention is not limited thereto and not only moving images but also still images may be generated and displayed.

What is claimed is:

1. A signal processing apparatus comprising:
- a first image generating unit that generates an image;
- a second image generating unit that generates an image different from the image generated by the first image generating unit;
- a first selecting unit that selects at least one of the first image generating unit and the second image generating unit and outputs an image from the selected one;
- an image signal processing unit that performs signal processing on the image outputted from the first selecting unit and outputs the processed image;
- a second selecting unit that selects one of the first selecting unit and the image signal processing unit and outputs an image from the selected one;
- a storing unit that stores information on operations of the second image generating unit and the image signal processing unit; and
- a third selecting unit that selects at least one of the second image generating unit and the image signal processing unit and connects the selected one to the storing unit, whereby the storing unit is shared between the second image generating unit and the image signal processing unit.

2. The signal processing apparatus according to claim 1, further comprising a selection control unit that controls selections made by the second selecting unit and the third selecting unit.

3. The signal processing apparatus according to claim 1, wherein when the first selecting unit selects the first image generating unit, the second selecting unit and the third selecting unit select the image signal processing unit.

4. The signal processing apparatus according to claim 1, wherein when the first selecting unit selects the second image generating unit, the second selecting unit selects the first selecting unit and the third selecting unit selects the second image generating unit.

5. The signal processing apparatus according to claim 1, wherein when the first selecting unit selects the first image generating unit and the second image generating unit, the second selecting unit selects the image signal processing unit and the third selecting unit selects the second image generating unit and the image signal processing unit.

6. The signal processing apparatus according to claim 1, wherein the image signal processing unit performs a process of converting a frame rate.

7. A signal processing method comprising:

a first image generation step of generating an image in a first image generating unit;

a second image generation step of generating an image in a second image generating unit that is different from the image generated in the first image generation step;

a first selection step of selecting at least one of the image generated in the first image generation step and the image generated in the second image generation step and outputting the selected image;

an image signal processing step of performing, in an image signal processing unit, signal processing on the image outputted in the first selection step and outputting the processed image;

a second selection step of selecting one of the image outputted in the first selection step and the image outputted in the image signal processing step and outputting the selected image; and a third selection step of selecting at least one of the second image generating unit and the image signal processing unit and connecting the selected one to a storing unit that stores information on operations of the second image generating unit and the image signal processing unit, whereby the storing unit is shared between the second image generating unit and the image signal processing unit.

* * * * *